(12) United States Patent
Takahashi et al.

(10) Patent No.: US 11,515,746 B2
(45) Date of Patent: Nov. 29, 2022

(54) COOLING MECHANISM FOR VEHICLE ELECTRIC MOTOR

(71) Applicants: TOYOTA JIDOSHA KABUSHIKI KAISHA, Toyota (JP); AISIN AW CO., LTD., Anjo (JP)

(72) Inventors: Nobuyuki Takahashi, Toyota (JP); Junichi Yokota, Anjo (JP); Yasunari Furuta, Anjo (JP)

(73) Assignees: TOYOTA JIDOSHA KABUSHIKI KAISHA, Toyota (JP); AISIN AW CO., LTD., Anjo (JP)

( * ) Notice: Subject to any disclaimer, the term of this patent is extended or adjusted under 35 U.S.C. 154(b) by 33 days.

(21) Appl. No.: 16/846,767

(22) Filed: Apr. 13, 2020

(65) Prior Publication Data

US 2020/0358326 A1 Nov. 12, 2020

(30) Foreign Application Priority Data

May 6, 2019 (JP) .............................. JP2019-087232

(51) Int. Cl.
*H02K 1/32* (2006.01)
*H02K 9/193* (2006.01)
(Continued)

(52) U.S. Cl.
CPC ................ *H02K 1/32* (2013.01); *B60K 11/02* (2013.01); *H02K 1/276* (2013.01); *H02K 7/006* (2013.01); *H02K 9/193* (2013.01)

(58) Field of Classification Search
CPC ............ H02K 1/32; H02K 1/325; H02K 9/19; H02K 9/193; H02K 1/276; H02K 7/006; B60K 1/02; B60K 11/02; B60Y 2200/92
(Continued)

(56) References Cited

U.S. PATENT DOCUMENTS

2013/0038151 A1* 2/2013 Ohashi ..................... H02K 1/32
310/59
2013/0151057 A1* 6/2013 Matsubara ............ B60W 20/00
701/22

(Continued)

FOREIGN PATENT DOCUMENTS

CN           103079866 A      5/2013
JP        2009232557 A   * 10/2009
(Continued)

OTHER PUBLICATIONS

JP-2009232557-A (English Translation) (Year: 2009).*
JP-2013055775-A (English Translation) (Year: 2013).*

*Primary Examiner* — Quyen P Leung
*Assistant Examiner* — Alexander Moraza
(74) *Attorney, Agent, or Firm* — Oblon, McClelland, Maier & Neustadt, L.L.P.

(57) ABSTRACT

A cooling mechanism for a vehicle electric motor. The cooling mechanism includes: a coolant oil passage provided between a rotor core and a rotor shaft of the electric motor; an oil supply passage provided inside the rotor shaft and communicating with the coolant oil passage; and at least one first discharge port and at least one second discharge port provided in respective first and second end plates disposed on respective opposite sides of the rotor core. The coolant oil passage includes a first passage portion communicating with the at least one first discharge port, and a second passage portion communicating with the at least one second discharge port. Each of the at least one first discharge port is located in a position that is different from a position of any one of the at least one second discharge port as seen in an axial direction of the rotor shaft.

4 Claims, 4 Drawing Sheets

(51) Int. Cl.
*H02K 1/27* (2022.01)
*H02K 1/276* (2022.01)
*B60K 11/02* (2006.01)
*H02K 7/00* (2006.01)

(58) Field of Classification Search
USPC .................. 310/61, 60 A, 54, 58, 59, 52
See application file for complete search history.

(56) References Cited

U.S. PATENT DOCUMENTS

| | | | | |
|---|---|---|---|---|
| 2015/0137632 A1* | 5/2015 | Takahashi | ............... | H02K 1/28 |
| | | | | 310/216.106 |
| 2019/0103778 A1* | 4/2019 | Paul | ...................... | H02K 9/12 |

FOREIGN PATENT DOCUMENTS

| | | | | |
|---|---|---|---|---|
| JP | 2010-239799 A | | | 10/2010 |
| JP | 2013-059193 A | | | 3/2013 |
| JP | 2013055775 A | * | | 3/2013 |
| JP | 2015-97436 A | | | 5/2015 |
| JP | 2019-187063 A | | | 10/2019 |

\* cited by examiner

COOLING MECHANISM FOR VEHICLE ELECTRIC MOTOR

This application claims priority from Japanese Patent Application No. 2019-087232 filed on May 6, 2019, the disclosure of which is herein incorporated by reference in its entirety.

FIELD OF THE INVENTION

The present invention relates to an improvement in a cooling performance of a cooling mechanism that is to be provided for a vehicle electric motor.

BACKGROUND OF THE INVENTION

There is known a cooling mechanism for cooling an electric motor that is to be provided in a vehicle. For example, Patent Document 1 discloses a construction for cooling a rotor core and a stator coil of an electric motor. In the disclosed construction, a coolant oil passage is provided between an inner peripheral portion of the rotor core and a rotor shaft of the electric motor so as to extend in an axial direction of the rotor shaft, such that the rotor core is cooled by a coolant oil that is caused to flow through the coolant oil passage and such that the stator coil is cooled by the coolant oil that is discharged from the coolant oil passage and is guided to the stator coil.

PRIOR ART DOCUMENTS

Patent Documents

[Patent Document 1] JP-2013-59193A
[Patent Document 2] JP-2010-239799A

SUMMARY OF THE INVENTION

By the way, in the construction disclosed in Patent Document 1, a pair of end plates are provided on respective opposite sides of the rotor core, and one of the end plates is provided with a coolant discharge port through which the coolant oil passage is held in communication of an exterior, for thereby causing the coolant oil to be supplied to the stator coil through the coolant discharge port. Further, the other of the end plates is provided with a coolant discharge passage that is held in communication with a coolant supply port provided in the rotor shaft, for thereby causing the coolant oil to be supplied to the stator coil through an exit of the coolant discharge passage. The pair of end plates, which are provided on the respective opposite sides of the rotor core, are considerably different in shape from each other, because the above-described one of the end plates is provided with the coolant discharge port while the above-described other of the end plates is provided with the coolant discharge passage and a protrusion. Consequently, the shape of the rotor has a poor symmetricity, so that there is a problem that the rotor could suffer from bias or run-out during of rotation of the rotor.

The present invention was made in view of the background art described above. It is therefore an object of the present invention to provide a cooling mechanism that is to be provided for a vehicle electric motor, wherein the cooling mechanism is capable of supplying a coolant oil evenly to a stator coil of the electric motor and assuring a symmetricity of a rotor of the electric motor. This object is achieved according to the following aspects of the present invention.

According to a first aspect of the invention, there is provided a cooling mechanism to be provided for a vehicle electric motor that includes: a rotor; a stator disposed on an outer peripheral side of the rotor; and a stator coil wound on the stator, wherein the rotor includes a rotor shaft, a rotor core disposed on an outer periphery of the rotor shaft and unrotatable relative to the rotor shaft, and first and second end plates disposed on respective opposite sides of the rotor core that are opposite to each other in an axial direction of the rotor shaft, wherein the cooling mechanism comprises: (a) a coolant oil passage provided between the rotor core and the rotor shaft and extending in the axial direction of the rotor shaft, the coolant oil passage including a plurality of passage portions arranged in a circumferential direction of the rotor core, the plurality of passage portions including at least one first passage portion and at least one second passage portion; (b) an oil supply passage provided inside the rotor shaft and held in communication with the coolant oil passage; (c) at least one first discharge port which is held in communication with the at least one first passage portion of the coolant oil passage and which is provided in the first end plate, such that the at least one first discharge port extends through the first end plate in the axial direction of the rotor shaft; and (d) at least one second discharge port which is held in communication with the at least one second passage portion of the coolant oil passage and which is provided in the second end plate, such that the at least one second discharge port extends through the second end plate in the axial direction of the rotor shaft, wherein each of the at least one first discharge port is located in a position that is different from a position of any one of the at least one second discharge port as seen in the axial direction of the rotor shaft. For example, each of the at least one first passage portion of the coolant oil passage is held in communication with a corresponding one of the at least one first discharge port, and is located in substantially the same position as the corresponding one of the at least one first discharge port as seen in the axial direction of the rotor shaft, wherein each of the at least one second passage portion of the coolant oil passage is held in communication with a corresponding one of the at least one second discharge port, and is located in substantially the same position as the corresponding one of the at least one second discharge port as seen in the axial direction of the rotor shaft.

According to a second aspect of the invention, in the cooling mechanism according to the first aspect of the invention, the at least one first discharge port consists of a plurality of first discharge ports, and the at least one second discharge port consists of a plurality of second discharge ports, wherein the plurality of first discharge ports and the plurality of second discharge ports are alternately arranged in the circumferential direction of the rotor core as seen in the axial direction of the rotor shaft, and are equi-angularly spaced apart from each other in the circumferential direction as seen in the axial direction of the rotor shaft.

According to a third aspect of the invention, in the cooling mechanism according to the first or second aspect of the invention, each of the plurality of passage portions of the coolant oil passage is defined by a groove that is provided in an inner circumferential surface of the rotor core.

In the cooling mechanism according to the first aspect of the invention, the at least one first discharge port and the at least one second discharge port are provided in the first end plate and the second end plate, respectively, which are provided on the respective opposite sides of the rotor core and are adjacent to the rotor core, so that oil flowing through the coolant oil passage is discharged through both of the first and second discharge ports. Therefore, the oil is supplied to both of coil ends of the stator coil which are located on respective opposite sides of the stator (that are opposite to each other in the axial direction of the rotor shaft), so that the stator coil is evenly cooled without cooling being biased to one of the coil ends. Further, each of the at least one first discharge port and the at least one second discharge port may be defined by a through-hole that passes through a corresponding one of the first and second end plates, so that the first and second end plates have a high degree of symmetry. Consequently, the rotor has a shape having a high degree of symmetry, thereby making it possible to restrain unbalance or run-out of the rotor during rotation of the rotor.

In the cooling mechanism according to the second aspect of the invention, the plurality of first discharge ports and the plurality of second discharge ports are alternately arranged in the circumferential direction of the rotor core as seen in the axial direction of the rotor shaft, and are equi-angularly spaced apart from each other in the circumferential direction as seen in the axial direction of the rotor shaft. Therefore, the oil discharged from the first and second discharge ports is caused to fly or moved in various radial directions, whereby the annular-shaped stator coil can be substantially evenly cooled.

In the cooling mechanism according to the third aspect of the invention, each of the plurality of passage portions of the coolant oil passage is defined by the groove that is provided in the inner circumferential surface of the rotor core. Therefore, where the rotor core is constituted by a plurality of steel plates each of which is formed through a punching process, the groove can be provided in the inner circumferential surface of the rotor core, by only forming a cutout or semi-circular shaped hole in an inner peripheral end portion of each of the steel plates without complicating a punched-out configuration or shape in the punching process.

DETAILED DESCRIPTION OF PREFERRED EMBODIMENT

Hereinafter, a preferred embodiment of the invention will be described in detail with reference to the accompanying drawings. The figures of the drawings are simplified or deformed as needed, and each portion is not necessarily precisely depicted in terms of dimension ratio, shape, etc.

Embodiment

Figure 1:
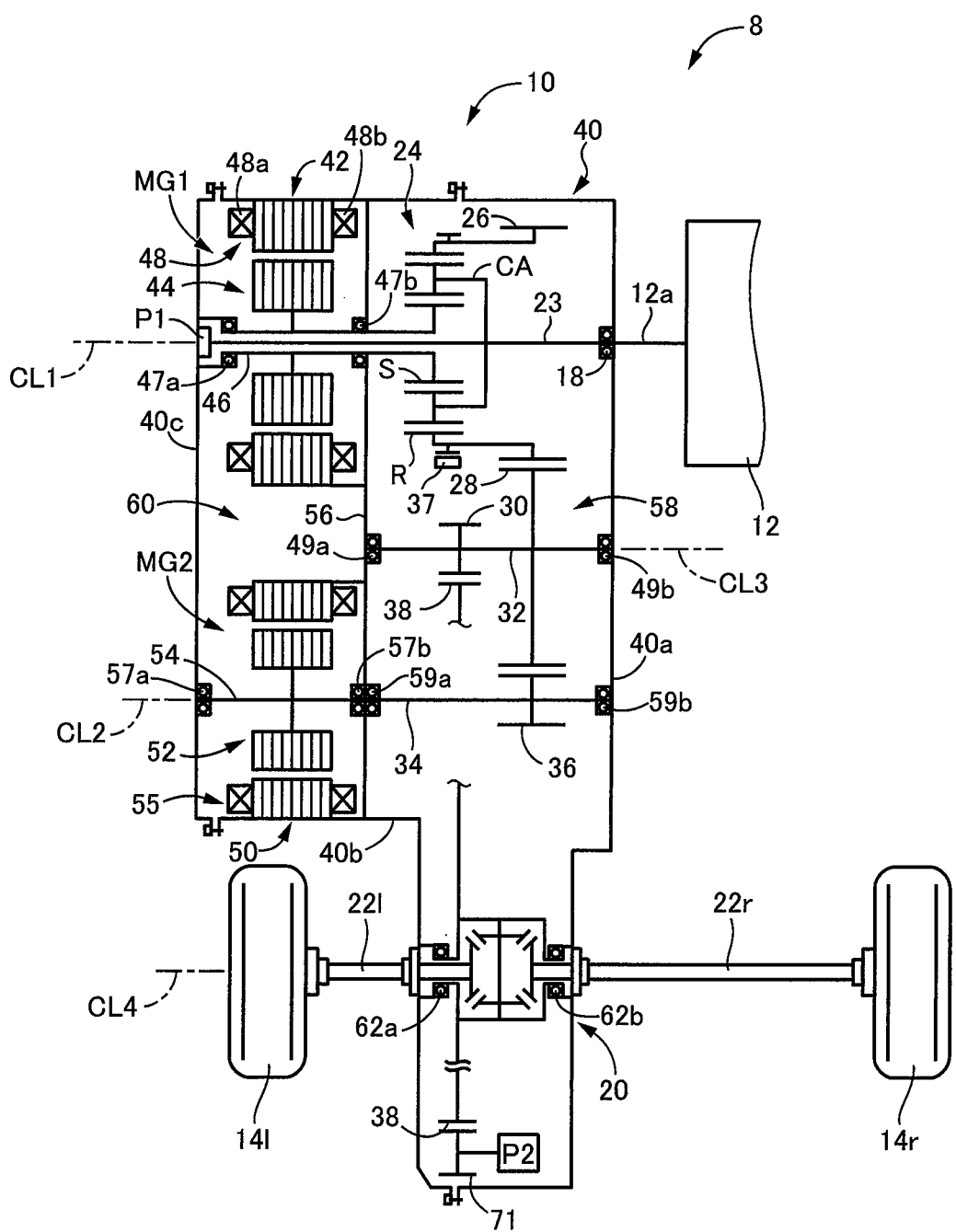
FIG. 1 is a view schematically showing, by way of example, construction of a vehicle drive-force transmitting apparatus to which the present invention is applied.

FIG. 1 is a view schematically showing, by way of example, construction of a drive-force transmitting apparatus 10 to which the present invention is applied, wherein the drive-force transmitting apparatus 10 is to be installed in a vehicle 8. The drive-force transmitting apparatus 10 is to be used advantageously in the vehicle 8 of FF (front engine/front drive) system. The drive-force transmitting apparatus 10 is a drive-force transmitting apparatus of hybrid type, which is to be disposed between an engine 12 and drive wheels 14 of the vehicle 8, so as to transmit a drive force outputted from the engine 12 as a drive-force source and a drive force outputted from a second electric motor MG2 as another main drive-force source, to right and left drive wheels $14r$, $14l$ (hereinafter simply referred to as "drive wheels 14" unless they are to be distinguished from each other) via a differential device 20 and right and left axles $22r$, $22l$ (hereinafter simply referred to as "axles 22" unless they are to be distinguished from each other).

As shown in FIG. 1, the drive-force transmitting apparatus 10 includes the above-described differential device 20, the above-described axles 22, an input shaft 23, a planetary gear device 24, an output gear 26, a counter gear 28, a differential drive gear 30, a counter shaft 32, a drive-force transmitting shaft 34, a reduction gear 36, a first electric motor MG1 and the above-described second electric motor MG2. The input shaft 23 is disposed to rotatable about a first axis CL1. The planetary gear device 24, first electric motor MG1 and output gear 26 are disposed to be coaxial with the input shaft 23 and are located radially outside the input shaft 23. The drive-force transmitting shaft 34 is disposed to be rotatable about a second axis CL2. The second electric motor MG2 is disposed to be coaxial with the drive-force transmitting shaft 34 so as to be rotatable about the second axis CL2. The reduction gear 36 is disposed on the drive-force transmitting shaft 34. The counter shaft 32 is disposed to be rotatable about a third axis CL3. The counter gear 28 and differential drive gear 30 are disposed on the counter shaft 32. The differential device 20 and the axles 22 are disposed to be rotatable about a fourth axis CL4. All of these rotary members are disposed inside a casing 40 as a non-rotary member. The drive-force transmitting apparatus 10 further includes a parking lock mechanism 37 configured to stop rotation of the output gear 26. It is noted that all of the first through fourth axes CL1-CL4 are rotary axes that are parallel to a width direction of the vehicle 8.

The input shaft 23 is connected to the engine 12 through members such as a crank shaft 12a and a damper (not shown), in a drive-force transmittable manner. The input shaft 23 is held, through members such as a bearing 18, by the casing 40 as the non-rotary member, such that the input shaft 23 is rotatable about the first axis CL1.

The planetary gear device 24, which is disposed to be coaxial with the first axis CL1, is a single-pinion type planetary gear device (differential mechanism) that includes a sun gear S, a carrier CA and a ring gear R. The planetary gear device 24 serves as a drive-force distributing mechanism configured to distribute the drive force of the engine 12 to the output gear 26 and the first electric motor MG1. The sun gear S of the planetary gear device 24 is connected to the first electric motor MG1 in a drive-force transmittable manner. The carrier CA of the planetary gear device 24 is connected to the engine 12 through the input shaft 23 and the crank shaft 12a in a drive-force transmittable manner. The ring gear R of the planetary gear device 24 is connected to the output gear 26 in a drive-force transmittable manner. It is noted that the ring gear R and the output gear 26 are formed integrally with each other, namely, are constituted by a compound gear.

A first oil pump P1 is disposed on the first axis CL1, and is located in one of opposite end portions, which is remote from the engine 12, in an axial direction of the input shaft 23. The first oil pump P1 is to be driven by the engine 12. The first oil pump P1 includes a drive gear (not shown) that is connected to an axial end portion of the input shaft 23, such that the first oil pump P1 is to be driven by the engine 12 through the input shaft 23.

The first electric motor MG1 is disposed in a position adjacent to the planetary gear device 24, with a partition wall 56 (that is a part of the casing 40) being located between the first electric motor MG1 and the planetary gear device 24 in a direction of the first axis CL1. The first electric motor MG1 includes an annular-shaped stator 42 that is unrotatably fixed to the casing 40 as the non-rotary member, an annular-shaped rotor 44 that is disposed on an inner peripheral side of the stator 42, and a stator coil 48 that is wound on the stator 42.

The stator 42 is disposed on an outer peripheral side of the rotor 44, and is fixed to the casing 40 by means of bolts (not shown), such that the stator 42 is unrotatable relative to the casing 40. The rotor 44 includes a rotor core 72 (see FIG. 2) and a rotor shaft 46 that is fixed to an inner circumferential surface of the rotor core 72. Construction of the rotor 44 will be described later. The rotor shaft 46 is held at its axially opposite end portions by the casing 40 through a pair of bearings 47a, 47b, such that the rotor shaft 46 is rotatable about the first axis CL1.

The output gear 26 is connected to the ring gear R of the planetary gear device 24, and meshes with the counter gear 28 that is disposed on the counter shaft 32. The counter shaft 32 is held at its axially opposite end portions by the casing 40 through a pair of bearings 49a, 49b, such that the counter shaft 32 is rotatable about the third axis CL3.

The second electric motor MG2 and the reduction gear 36 are disposed to be rotatable about the second axis CL2, with the partition wall 56 being located between the second electric motor MG2 and the reduction gear 36 in a direction of the second axis CL2.

The second electric motor MG2 includes an annular-shaped stator 50 that is unrotatably fixed to the casing 40 as the non-rotary member, an annular-shaped rotor 52 disposed on an inner peripheral side of the stator 50, and a stator coil 55 that is wound on the stator 50.

The stator 50 is disposed on an outer peripheral side of the rotor 52, and is fixed to the casing 40 by means of bolts (not shown), such that the stator 50 is unrotatable relative to the casing 40. The rotor 52 includes a rotor shaft 54 that is held at its axially opposite end portions by the casing 40 through a pair of bearings 57a, 57b, such that the rotor shaft 54 is rotatable about the second axis CL2.

The reduction gear 36 is formed integrally with the drive-force transmitting shaft 34, and meshes with the counter gear 28 disposed on the counter shaft 32. The number of teeth of the reduction gear 36 is smaller than the number of teeth of the counter gear 28. Thus, rotation of the second electric motor MG2 is transmitted to the counter shaft 32 through the reduction gear 36 and the counter gear 28, such that a rotational speed of the counter shaft 32 is made lower than a rotational speed of the second electric motor MG2. The drive-force transmitting shaft 34 is held at its axially opposite end portions by the casing 40 through a pair of bearings 59a, 59b, such that the drive-force transmitting shaft 34 is rotatable about the second axis CL2.

The counter gear 28 and the differential drive gear 30 are disposed on the counter shaft 32, unrotatably relative to the counter shaft 32 that is to be rotated about the third axis CL3. The counter gear 28 meshes with the output gear 26 and the reduction gear 36 so that the drive force outputted from the engine 12 and/or the drive force outputted from the second electric motor MG2 are to be transmitted. The differential drive gear 30 meshes with a differential ring gear 38 of the differential device 20. Thus, when the drive force drive force outputted from the engine 12 and/or the drive force outputted from the second electric motor MG2 are transmitted to the counter shaft 32 through the output gear 26 and/or the reduction gear 36, the drive force or forces are transmitted to the differential device 20 through the differential drive gear 30.

The differential device 20 and the pair of axles 22r, 22l are disposed to be rotatable about the fourth axis CL4. The differential ring gear 38 of the differential device 20 meshes with the differential drive gear 30 so that the drive force outputted from the engine 12 and/or the drive force outputted from the second electric motor MG2 are to be inputted to the differential device 20 through the differential ring gear 38.

The differential device 20 is constituted by a well-known differential mechanism, and is configured to transmit the drive force to the right and left axles 22r, 22l while allowing rotation of each of the axles 22r, 22l relative to the other of the axles 22r, 22l. It is noted that detailed description of the differential device 20, which is a known device, is not provided.

The differential device 20 is held, at its opposite end portions that are opposite to each other in a direction of the fourth axis CL4, by the casing 40 through a pair of bearings 62a, 62b, such that the differential device 20 is rotatable about the fourth axis CL4. Further, the differential ring gear 38 of the differential device 20 meshes with a pump drive gear 71 of a second oil pump P2. The second oil pump P2 is a mechanical oil pump that is to be mechanically rotated or driven together with rotation of the differential ring gear 38 through the pump drive gear 71 that meshes with the differential ring gear 38.

In the drive-force transmitting apparatus 10 constructed as described above, the drive force of the engine 12 is transmitted to the right and left drive wheels 14r, 14l through the planetary gear device 24, output gear 26, counter gear 28, counter shaft 32, differential drive gear 30, differential device 20 and right and left axles 22r, 22l. Further, the drive force of the second electric motor MG2 is transmitted to the right and left drive wheels 14r, 14l through the rotor shaft 54, drive-force transmitting shaft 34, reduction gear 36, counter gear 28, counter shaft 32, differential drive gear 30, differential device 20 and right and left axles 22r, 22l.

The casing 40 is constituted by a housing 40a, an axle case 40b and a case cover 40c that are fixed to one another. The axle case 40b opens in its opposite ends that are opposite to each other in the direction of the first axis CL1. The axle case 40b is fixedly connected at one of the openings to the housing 40a, such that the one of the openings is enclosed by the housing 40a. The axle case 40b is fixedly connected at the other of the openings to the case cover 40c, such that the other of the openings is enclosed by the case cover 40c.

The axle case 40b is provided with the partition wall 56 that extends in a direction perpendicular to the first axis CL1. By the partition wall 56, an interior of the casing 40 is sectioned into a gear room 58 and a motor room 60, such that various gears or devices such as the planetary gear device 24, output gear 26, counter gear 28, reduction gear 36 and differential device 20 are disposed within the gear room 58 and such that the first and second electric motors MG1, MG2 are disposed within the motor room 60.

Each of the first and second electric motors MG1, MG2 is provided with a cooling mechanism 64. The cooling mechanism 64, which is to be provided in the first electric motor MG1, will be described. The cooling mechanism 64, which is to be provided in the second electric motor MG2, has substantially the same construction as the cooling mechanism 64 for the first electric motor MG1, and will not be described. It is noted that each of the first and second electric motors MG1, MG2 corresponds to "electric motor" recited in the appended claims.

Figure 2:
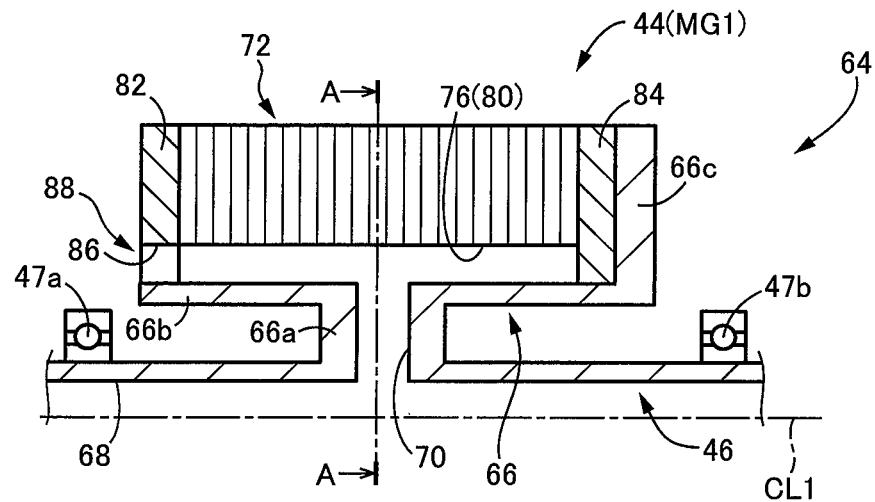
FIG. 2 is a cross sectional view of a rotor shown in FIG. 1, wherein the cross sectional view is taken in a plane containing a first axis CL1.
Figure 3:
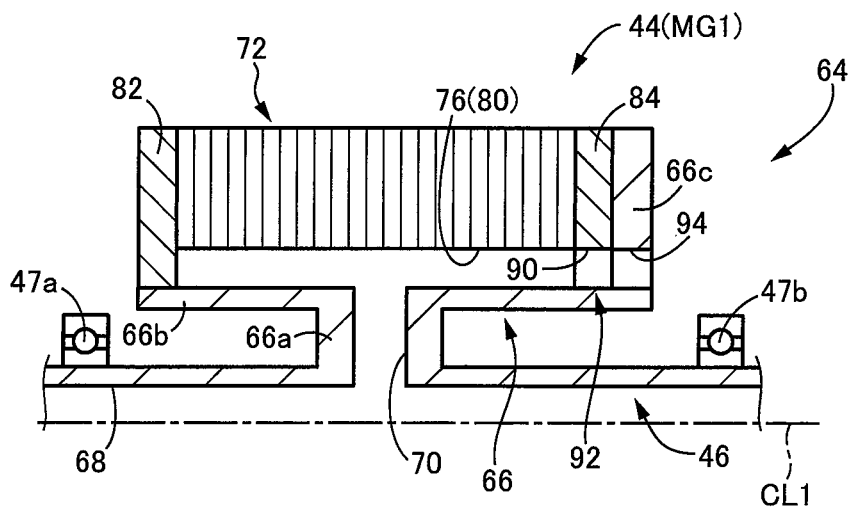
FIG. 3 is another cross sectional view of the rotor shown in FIG. 1, wherein the cross sectional view is taken in another plane that is other than the plane in which the cross sectional view of FIG. 2 is taken.

FIG. 2 is a cross sectional view of the rotor 44 of the first electric motor MG1 shown in FIG. 1, wherein the cross section view is taken in a plane containing the first axis CL1. FIG. 3 is another cross sectional view of the rotor 44, wherein the cross sectional view is taken in another plane that is other than the plane in which the cross sectional view of FIG. 2 is taken. It is noted that the first electric motor MG1 is constructed substantially symmetrically about the first axis CL1, so that a lower half of the first electric motor MG1 is not shown in FIGS. 2 and 3. It is further noted that the input shaft 23 axially extending through inside the rotor shaft 46 shown in FIG. 1 is not shown in FIGS. 2 and 3.

As shown in FIGS. 2 and 3, the rotor shaft 46 of the rotor 44 is provided to be rotatable about the first axis CL1. A rotor-core supporting portion 66 is provided in an outer peripheral portion of the rotor shaft 46, and supports the rotor core 72. The rotor-core supporting portion 66 includes a brim portion 66a that extends radially from an outer circumferential surface of the rotor shaft 46, a cylindrical portion 66b that is connected to an outer peripheral end portion of the brim portion 66a, and a flange portion 66c that extends radially outwardly from one of opposite end portions of the cylindrical portion 66b which are opposite to each other in the direction of the first axis CL1.

The rotor shaft 46, which is a hollow shaft, defines, in its inside, an axially-extending oil passage 68 extending in parallel to the first axis CL1 and a plurality of radially-extending oil passages 70 which are held in communication with the axially-extending oil passage 68 and which extend radially outwardly from an inner circumferential surface of the axially-extending oil passage 68. The axially-extending oil passage 68 and the radially-extending oil passages 70 cooperate to constitute "oil supply passage" which is recited in the appended claims and which is provided inside "rotor shaft" that is also recited in the appended claims.

Figure 4:
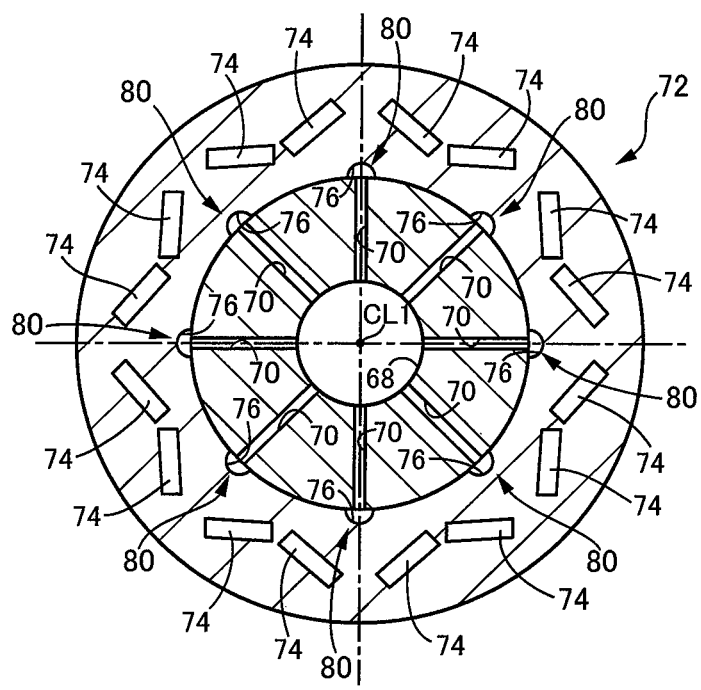
FIG. 4 is a cross sectional view taken along line A-A in FIG. 2.

FIG. 4 is a cross sectional view of the rotor 44, wherein the cross sectional view is taken along line A-A in FIG. 2. As shown in FIG. 4, the plurality of radially-extending oil passages 70, which are held in communication with the axially-extending oil passage 68 and extend radially outwardly from the axially-extending oil passage 68, consist of eight radially-extending oil passages 70 that are equi-angularly spaced apart from each other about the first axis CL1 with an angular interval of 45 degrees between each adjacent two of the radially-extending oil passages 70. The radially-extending oil passages 70 are held in communication with respective coolant oil passages 80 that are provided between the rotor core 72 and the rotor shaft 46. An oil discharged from the first oil pump P1 is supplied to the axially-extending oil passage 68, and the oil flowing through the axially-extending oil passage 68 is supplied to the coolant oil passages 80 through the respective radially-extending oil passages 70. It is noted that the coolant oil passages 80 cooperate with one another to constitute "coolant oil passage" recited in the appended claims, and the coolant oil passages 80 corresponds to "a plurality of passage portions (included in the "coolant oil passage")" recited in the appended claims.

Referring back to FIGS. 2 and 3, the rotor core 72 is disposed on an outer periphery of the cylindrical portion 66b of the rotor-core supporting portion 66 such that the rotor core 72 is unrotatable relative to the cylindrical portion 66b of the rotor-core supporting portion 66. The rotor core 72 is constituted by a plurality of steel plates laminated on each other, and has an annular shape as a whole. Further, the rotor core 72 is provided with a plurality of permanent magnets 74 that are disposed inside the rotor core 72 (see FIG. 4).

The rotor core 72 is inhibited from being rotated relative to the cylindrical portion 66b, for example, owing to an arrangement in which protrusions (not shown) provided on an inner periphery portion of the rotor core 72 (i.e., an inner periphery portion of each of the steel plates) are engaged in respective recesses (not shown) provided in an outer circumferential surface of the cylindrical portion 66b of the rotor-core supporting portion 66. The rotor core 72 has eight grooves 76 which are provided in an inner circumferential surface of the rotor core 72 and extend in parallel to the first axis CL1. Each of the grooves 76 has a semi-circular cross section shape, namely, has a semi-circular shape as seen in the direction of the first axis CL1, as shown in FIG. 4. Each of the coolant oil passages 80 is surrounded or defined by a corresponding one of the grooves 76 and the outer circumferential surface of the cylindrical portion 66b on which the rotor core 72 is fitted. Each of the coolant oil passages 80 extends in parallel to the first axis CL1, and opens in axially opposite ends of the rotor core 72 which are opposite to each other in the direction of the first axis CL1 (i.e., an axial direction of the rotor shaft 46). As shown in FIG. 4, the coolant oil passages 80 consist of eight coolant oil passages 80 that are equi-angularly spaced apart from each other in a circumferential direction of the rotor core 72 about the first axis CL1 with an angular interval of 45 degrees between each adjacent two of the coolant oil passages 80. Each of the eight radially-extending oil passages 70 is held in communication with a corresponding one of the right radially-extending oil passages 70 that are provided inside the rotor shaft 46.

A pair of end plates, i.e., first and second end plates 82, 84 are provided on respective opposite sides of the rotor core 72, which are opposite to each other in the direction of the first axis CL1 (i.e., the axial direction of the rotor shaft 46), such that the rotor core 72 is sandwiched by the first and second end plates 82, 84. Each of the first and second end plates 82, 84 has protrusions (not shown) provided in its inner peripheral portion, like the rotor core 72, for example, and the protrusions of each of the first and second end plates 82, 84 are engaged in respective recess (not shown) provided in the cylindrical portion 66b of the rotor-core supporting portion 66, so that each of the first and second end plates 82, 84 is inhibited from being rotated relative to the cylindrical portion 66b. The first and second end plates 82, 84 constitute parts of the rotor 44.

Figure 5:
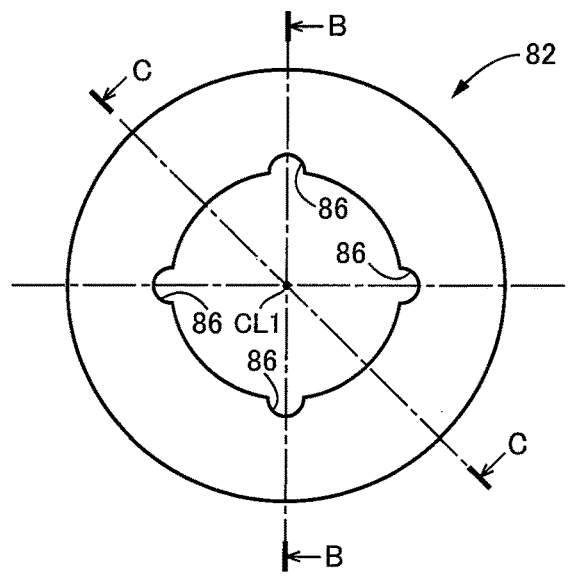
FIG. 5 is a view of a first end plate shown in FIG. 2, wherein the view is as seen in a direction of the first axis CL1.

The first end plate 82 is constituted by a disk-shaped plate having a given thickness, and has an outer peripheral end that is flush with an outer circumferential surface of the rotor core 72, as shown in FIGS. 2 and 3. The first end plate 82 is in contact with a nut (not shown) that is fastened to the cylindrical portion 66b, for example, whereby the first end plate 82 is avoided from being removed from the cylindrical portion 66b. As shown in FIG. 5, the first end plate 82 has, in its inner peripheral end portion, a plurality of grooves 86 that extends in the direction of the first axis CL1 throughout the thickness of the first end plate 82. In a state in which the first electric motor MG1 has been assembled, the grooves 86 are located in respective positions aligned with ends of the respective coolant oil passages 80, so as to be held in communication with the respective coolant oil passages 80.

FIG. 5 is a view of the first end plate 82 shown in FIG. 2, wherein the view is as seen in the direction of the first axis CL1. As shown in FIG. 5, the plurality of grooves 86 consist of four grooves 86 that are equi-angularly spaced apart from each other in the circumferential direction about the first axis CL1 with an angular interval of 90 degrees between each adjacent two of the grooves 86. Like each of the above-described grooves 76 of the rotor core 72, each of the grooves 86 has a semi-circular cross section shape, namely, has a semi-circular shape as seen in the direction of the first axis CL1. Each of a plurality of first discharge ports 88 (see FIG. 2) is surrounded or defined by a corresponding one of the grooves 86 and the outer circumferential surface of the cylindrical portion 66b of the rotor-core supporting portion 66 on which the first end plate 82 is fitted. The plurality of first discharge ports 88 consist of four first discharge ports 88 that are equi-angularly spaced apart from each other in the circumferential direction about the first axis CL1 with an angular interval of 90 degrees between each adjacent two of the first discharge ports 88. Each of the first discharge ports 88 extends through the first end plate 82 in the direction of the first axis CL1 (i.e., the axial direction of the rotor shaft 46).

A cross section of the first end plate 82, which is taken along line B-B in FIG. 5, is shown in the cross sectional view of FIG. 2. Another cross section of the first end plate 82, which is taken along line C-C in FIG. 5, is shown in the cross sectional view of FIG. 3.

Figure 6:
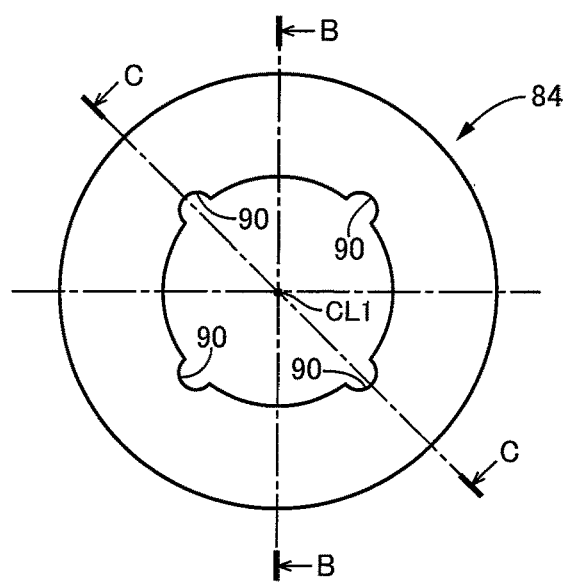
FIG. 6 is a view of a second end plate shown in FIG. 2, wherein the view is as seen in a direction of the first axis CL1.

Referring back to FIGS. 2 and 3, the second end plate 84 is constituted by a disk-shaped plate having a given thickness, and has an outer peripheral end that is flush with the outer circumferential surface of the rotor core 72, as shown in FIGS. 2 and 3. As shown in FIG. 6, the second end plate 84 has, in its inner peripheral end portion, a plurality of grooves 90 that extends in the direction of the first axis CL1 throughout the thickness of the second end plate 84. In a state in which the first electric motor MG1 has been assembled, the grooves 90 are located in respective positions aligned with ends of the respective coolant oil passages 80, so as to be held in communication with the respective coolant oil passages 80.

FIG. 6 is a view of the second end plate 84 shown in FIG. 2, wherein the view is as seen in the direction of the first axis CL1. As shown in FIG. 6, the plurality of grooves 90 consist of four grooves 90 that are equi-angularly spaced apart from each other in the circumferential direction about the first axis CL1 with an angular interval of 90 degrees between each adjacent two of the grooves 90. Like each of the above-described grooves 76 of the rotor core 72, each of the grooves 90 has a semi-circular cross section shape, namely, has a semi-circular shape as seen in the direction of the first axis CL1. Each of a plurality of second discharge ports 92 (see FIG. 3) is surrounded or defined by a corresponding one of the grooves 90 and the outer circumferential surface of the cylindrical portion 66b of the rotor-core supporting portion 66 on which the second end plate 84 is fitted. The plurality of second discharge ports 92 consist of four second discharge ports 92 that are equi-angularly spaced apart from each other in the circumferential direction about the first axis CL1 with an angular interval of 90 degrees between each adjacent two of the second discharge ports 92. Each of the second discharge ports 92 extends through the second end plate 84 in the direction of the first axis CL1 (i.e., the axial direction of the rotor shaft 46).

A cross section of the second end plate 84, which is taken along line B-B in FIG. 6, is shown in the cross sectional view of FIG. 2. Another cross section of the second end plate 84, which is taken along line C-C in FIG. 6, is shown in the cross sectional view of FIG. 3.

As gathered from FIGS. 5 and 6, in a state in which the first electric motor MG1 has been assembled, each of the grooves 86 of the first end plate 82 is located in a position that is different from a position of any one of the grooves 90 of the second end plate 84 as seen in the direction of the first axis CL1, namely, each of the grooves 86 is located in a position that does not overlap with a position of any one of the grooves 90 as seen in the direction of the first axis CL1. Therefore, each of the first discharge ports 88 is located in a position that is different from a position of any one of the second discharge ports 92 as seen in the direction of the first axis CL1, namely, each of the first discharge ports 88 is located in a position that does not overlap with a position of any one of the second discharge ports 92 as seen in the direction of the first axis CL1. Specifically, the first discharge ports 88 and the second discharge ports 92 are alternately arranged in a circumferential direction of the first and second end plates 82, 84, and are equi-angularly spaced apart from each other with an angular interval of 45 degrees between each adjacent pair of the first and second discharge ports 88, 92 in the circumferential direction as seen in the direction of the first axis CL1.

Further, as shown in FIGS. 2 and 3, each of the coolant oil passages 80 is held in communication with one of the first and second discharge ports 88, 92. In other words, as seen in the direction of the first axis CL1, each of the coolant oil passages 80 is located in a position overlapping with a position of one of the first and second discharge ports 88, 92, such that some of the coolant oil passages 80 overlap with the first discharge ports 88 but do not overlap with the second discharge ports 92 as seen in the direction of the first axis CL1, and such that the others of the coolant oil passages 80 overlap with the second discharge ports 92 but do not overlap with the first discharge ports 88 as seen in the direction of the first axis CL1. Further, since the first and second discharge ports 88, 92 are alternately arranged in the circumferential direction, the coolant oil passages 80 communicating the first discharge ports 88 and the coolant oil passages 80 communicating the second discharge ports 92 are alternately arranged in the circumferential direction. It is noted the above-described some of the coolant oil passages 80, which overlap with the first discharge ports 88, correspond to "at least one first passage portion (included in the plurality of passage portions)" recited in the appended claims, and that the above-described others of the coolant oil passages 80 overlap with the second discharge ports 92, which overlap with the second discharge ports 92, correspond to "at least one second passage portion (included in the plurality of passage portions)" recited in the appended claims.

Further, as shown in FIG. 3, the flange portion 66c of the rotor-core supporting portion 66 is provided with through-holes 94 that extend in the direction of the first axis CL1 and pass throughout the thickness of the flange portion 66c. The through-holes 94 are located in respective positions overlapping with the positions of the respective grooves 90 of the second end plate 84 as seen in the direction of the first axis CL1. That is, each of the through-holes 94 is held in communication with a corresponding one of the second discharge ports 92. The above-described axially-extending oil passage 68, radially-extending oil passages 70, coolant oil passages 80 (grooves 76), first discharge ports 88 (grooves 86), second discharge ports 92 (grooves 90) and through-holes 94, which are provided in the rotor shaft 46, cooperate to constitute the cooling mechanism 64 for cooling the first electric motor MG1.

There will be described an operation of the cooling mechanism 64 constructed as described above. The oil flowing through the axially-extending oil passage 68 of the rotor shaft 46 is supplied to the coolant oil passages 80 through the respective radially-extending oil passages 70. The oil flowing through some of the coolant oil passages 80 communicating with the first discharge ports 88 is discharged through the first discharge ports 88. The oil discharged through the first discharge ports 88 is caused to fly or moved outwardly in a radial direction of the rotor 44 by a centrifugal force generated by rotation of the rotor 44. Further, since the stator coil 48 includes coil ends 48a, 48b (see FIG. 1) that are provided on respective opposite sides of the stator 42 which are opposite to each other in the direction of the first axis CL1, the oil discharged through the first discharge ports 88 is caused to stick to the coil end 48a that is located in one of the opposite sides of the stator 42, so that the coil end 48a is cooled by the oil sticking to the coil end 48a.

Meanwhile, the oil flowing through the others of the coolant oil passages 80 communicating with the second discharge ports 92 is caused to pass through the second discharge ports 92 and is discharged through the through-holes 94. The oil passing through the second discharge ports 92 and discharged through the through-holes 94 is moved outwardly in the radial direction of the rotor 44 by the centrifugal force generated by rotation of the rotor 44, and is caused to stick to the coil end 48b that is located in the other of the opposite sides of the stator 42, so that the coil end 48b is cooled by the oil sticking to the coil end 48b.

As described above, the coil end 48a of the stator 42, which is located on one of the opposite sides of the stator 42 in the direction of the first axis CL1, is cooled by the oil discharged through the first discharge ports 88, while the coil end 48b of the stator 42, which is located on the other of the opposite sides of the stator 42 in the direction of the first axis CL1, is cooled by the oil passing through the second discharge ports 92 and discharged through the through-holes 94, so that the coil ends 48a, 48b, which are located on the respective opposite sides of the stator 42 in the direction of the first axis CL1, are both cooled. Therefore, the coil ends 48a, 48b of the stator coil 48, which are located on the respective opposite sides of the stator 42 in the direction of the first axis CL1, can be evenly cooled without the cooling being biased to one of the coil ends 48a, 48b.

Further, since the first discharge ports 88 are located in respective four positions that are equi-angularly spaced in the circumferential direction with the angular interval of 90 degrees, the oil discharged through the first discharge ports 88 is caused to fly or moved in various radial directions. Further, since the through-holes 94 are located in respective four positions that are equi-angularly spaced in the circumferential direction with the angular interval of 90 degrees, the oil discharged through the through-holes 94 is caused to fly or moved in various radial directions. Therefore, each of the annular-shaped coil ends 48a, 48b of the stator coil 48 is cooled evenly throughout the circumferential direction, and the coil ends 48a, 48b are cooled evenly without the cooling being biased to one of the coil ends 48a, 48b, owing to the arrangement in which the oil discharged through the first discharge ports 88 and the oil discharged through the through-holes 94 are moved in various radial directions and are supplied evenly to the coil ends 48a, 48b. Further, since the oil discharged through the first discharge ports 88 and the oil discharged through the through-holes 94 are caused to fly or moved toward the coil ends 48a, 48b of the stator coil 48 owing to the centrifugal force generated by rotation of the rotor 44, there is no need to provide a pipe or like for guiding the oil toward the coil ends 48a, 48b.

Further, each of the steel plates constituting the rotor core 72 can be formed, for example, in a punching process in which a steel plate having a given thickness is punched out to a disk-shaped plate. The grooves 76 also can be formed in the punching process, concurrently with the formation of the disk-shaped steel plate. In this instance, since the grooves 76 can be provided by only a plurality of semi-circular shaped holes formed in an inner peripheral end portions of the disk-shaped steel plate, the grooves 76 can be formed without complicating a punched-out configuration or shape in the punching process. Thus, it is possible to restrain reduction of productivity due to formation of the grooves 76 in each of the steel plates.

Further, since the coolant oil passages 80 can be provided by only forming the grooves 76 in the inner peripheral end portion of the rotor core 72, the provision of the coolant oil passages 80 can be made without substantial reduction of a cross sectional area of the rotor core 72, i.e., an area of the rotor core 72 as seen in the direction of the first axis CL1. It is therefore possible to restrain reduction of a magnetic property of the rotor 44 due to reduction of the area of the rotor core 72. Further, since the grooves 76 are provided in the inner peripheral end portion of the rotor core 72, the magnetic property of the rotor 44 is affected less than in an arrangement in which coolant oil passages are provided in a radially central portion of the rotor core 72. It is therefore possible to restrain reduction of performance of the first electric motor MG1 due to provision of the grooves 76 in the rotor core 72.

Moreover, since the grooves 76 of the rotor core 72 are equi-angularly arranged in the circumferential direction, the shape of the rotor core 72 has a high degree of symmetricity in the circumferential direction, thereby restraining unbalance or run-out of the rotor 44 during rotation of the rotor 44.

As described above, in the present embodiment, the first discharge ports 88 and the second discharge ports 92 are provided in the first end plate 82 and the second end plate 84, respectively, which are provided on the respective opposite sides of the rotor core 72 and are adjacent to the rotor core 72, so that the oil flowing through the coolant oil passages 80 is discharged through both of the first and second discharge ports 88, 92. Therefore, the oil is supplied to both of the coil ends 48a, 48b of the stator coil 48 which are located on respective opposite sides of the stator 42 (that are opposite to each other in the axial direction of the rotor shaft 46), so that the stator coil 48 is evenly cooled without cooling being biased to one of the coil ends 48a, 48b, whereby a cooling performance of the first electric motor MG1 is improved. Further, each of the first and second discharge ports 88, 92, which are provided in the first and second end plates 82, 84, is defined by a through-hole that passes through a corresponding one of the first and second end plates 82, 84, so that the first and second end plates 82, 84 have a high degree of symmetricity. Consequently, the rotor 44 has a shape having a high degree of symmetricity, thereby making it possible to restrain unbalance or run-out of the rotor 44 during rotation of the rotor 44.

In the present embodiment, the plurality of first discharge ports 88 and the plurality of second discharge ports 92 are alternately arranged in the circumferential direction as seen in the axial direction of the rotor shaft 46, and are equi-angularly spaced apart from each other in the circumferential direction as seen in the axial direction of the rotor shaft 46. Therefore, the oil discharged from the first and second discharge ports 88, 92 is caused to fly or moved in a plurality of radial directions, whereby the annular-shaped stator coil 48 (48a, 48b) can be substantially evenly cooled. Further, each of the coolant oil passages 80 is defined by the groove 76 that is provided in the inner circumferential surface of the rotor core 72. Therefore, where the rotor core 72 is constituted by a plurality of steel plates each of which is formed through a punching process, the groove 76 can be provided in the inner circumferential surface of the rotor core 72, by forming a cutout or semi-circular shaped hole in an inner peripheral end portion of each of the steel plates without complicating a punched-out configuration or shape in the punching process.

While the preferred embodiment of this invention has been described in detail by reference to the drawings, it is to be understood that the invention may be otherwise embodied.

For example, in the above-described embodiment, the vehicle 8 is a hybrid vehicle having drive force sources in the form of the engine 12 and the second electric motor MG2. However, the present invention is applicable not only to such a hybrid vehicle but also to an electric vehicle having a drive force source in the form of an electric motor.

In the above-described embodiment, the first discharge ports 88 and the second discharge ports 92 (through-holes 94) are alternately arranged in the circumferential direction as seen in the direction of the first axis CL1. However, the alternate arrangement is not essential for the invention. For example, some or all of the first discharge ports 88 may be arranged to be contiguous to each other in the circumferential direction, and some or all of the second discharge ports 92 (through-holes 94) may be arranged to be contiguous to each other in the circumferential direction.

In the above-described embodiment, the plurality of coolant oil passages 80 (i.e., grooves 76) consist of eight coolant oil passages 80 (i.e., eight grooves 76) that are equi-angularly arranged in the circumferential direction. However, the number of the coolant oil passages 80 does not necessarily have to be eight, but may be any other number that is two or more. The numbers of the first discharge ports 88, second discharge ports 92 and through-holes 94 also may be changed as needed depending on the number of the coolant oil passages 80. Further, the coolant oil passages 80 do not necessarily have to be equi-angularly arranged, but may be arranged with an angular interval between each adjacent two of the coolant oil passages 80 being inconstant.

In the above-described embodiment, the rotor-core supporting portion 66 includes the flange portion 66c provided in a position that is adjacent to the second end plate 84 in the direction of the first axis CL1. However, the provision of the flange portion 66c is not essential for the invention, and the invention is applicable also to the electric motor that does not include the flange portion 66c.

In the above-described embodiment, the rotor shaft 46 is provided with the rotor-core supporting portion 66 to which the rotor core 72 and other parts are fixed. However, the rotor core 72 and the other parts may be fixed directly to the outer circumferential surface of the rotor shaft 46 without through the rotor-core supporting portion 66.

In the above-described embodiment, the rotor core 72, first end plate 82 and second end plate 84 are inhibited from being rotated relative to the cylindrical portion 66b of the rotor-core supporting portion 66 owing to the arrangement in which the protrusions (not shown) provided in the inner peripheral portions of the respective rotor core 72, first end plate 82 and second end plate 84 are engaged with the respective recesses (not shown) provided in the cylindrical portion 66b. However, this arrangement is not essential. For example, rotations of the rotor core 72, first end plate 82 and second end plate 84 relative to the cylindrical portion 66b can be inhibited by any other arrangements such as an arrangement in which the rotor core 72, first end plate 82 and second end plate 84 are press-fitted onto the cylindrical portion 66b.

It is to be understood that the embodiment described above is given for illustrative purpose only, and that the present invention may be embodied with various modifications and improvements which may occur to those skilled in the art.

NOMENCLATURE OF ELEMENTS

42: stator
44: rotor
46: rotor shaft
48: stator coil
64: cooling mechanism
72: rotor core
76: groove
80: coolant oil passage
82: first end plate
84: second end plate
88: first discharge port
92: second discharge ports
MG1: first electric motor (vehicle electric motor)
MG2: second electric motor (vehicle electric motor)

What is claimed is:

1. A cooling mechanism to be provided for a vehicle electric motor that includes: a rotor; a stator disposed on an outer peripheral side of the rotor; and a stator coil wound on the stator,
    wherein the rotor includes a rotor shaft, a rotor core disposed on an outer periphery of the rotor shaft and unrotatable relative to the rotor shaft, and first and second end plates disposed on respective opposite sides of the rotor core that are opposite to each other in an axial direction of the rotor shaft, the first and second end plates being disk-shaped,
    wherein the cooling mechanism comprises:
    a coolant oil passage provided between the rotor core and the rotor shaft and extending in the axial direction of the rotor shaft, the coolant oil passage including a plurality of passage portions arranged in a circumferential direction of the rotor core, the plurality of passage portions including a plurality of first passage portions and a plurality of second passage portions;
    an oil supply passage provided inside the rotor shaft and held in communication with the coolant oil passage;
    a plurality of first discharge ports which is held in communication with the plurality of first passage portions of the coolant oil passage and which is provided in the first end plate, such that the plurality of first discharge ports extends through the first end plate in the axial direction of the rotor shaft, the plurality of first discharge ports being formed by first grooves on an inner circumferential surface of the first end plate; and a plurality of second discharge ports which is held in communication with the plurality of second passage portions of the coolant oil passage and which is provided in the second end plate, such that the plurality of second discharge ports extends through the second end plate in the axial direction of the rotor shaft, the plurality of second discharge ports being formed by second grooves on an inner circumferential surface of the second end plate, wherein the plurality of first discharge ports and the plurality of second discharge ports are alternately arranged in the circumferential direction of the rotor core as seen in the axial direction of the rotor shaft, and are equi-angularly spaced apart from each other in the circumferential direction as seen in the axial direction of the rotor shaft, wherein the rotor includes a rotor-core supporting portion which supports the rotor core, the rotor-core supporting portion including a brim portion that extends radially from an outer circumferential surface of the rotor shaft, a cylindrical portion that is connected to an outer peripheral end portion of the brim portion, and a flange portion that extends radially outwardly from one of opposite end portions of the cylindrical portion which are opposite to each other in the axial direction of the rotor shaft, and wherein the flange portion includes a plurality of through-holes extending in the axial direction of the rotor shaft and passing throughout a thickness of the flange portion, each of the plurality of through-holes being held in communication with a corresponding one of the plurality of second discharge ports.

2. The cooling mechanism according to claim 1,
wherein each of the plurality of passage portions of the coolant oil passage is defined by a groove that is provided in an inner circumferential surface of the rotor core.

3. The cooling mechanism according to claim 1,
wherein each of the plurality of first passage portions of the coolant oil passage is held in communication with a corresponding one of the plurality of first discharge ports, and is located in a substantially same position as the corresponding one of the plurality of first discharge ports as seen in the axial direction of the rotor shaft, and wherein each of the plurality of second passage portions of the coolant oil passage is held in communication with a corresponding one of the plurality of second discharge ports, and is located in a substantially same position as the corresponding one of the plurality of second discharge ports as seen in the axial direction of the rotor shaft.

4. The cooling mechanism according to claim 1,
wherein the first grooves and the second grooves have a semi-circular shape as seen in the axial direction of the rotor shaft.

* * * * *